United States Patent
Lin et al.

(10) Patent No.: US 8,424,449 B2
(45) Date of Patent: Apr. 23, 2013

(54) LIFTING COVER TYPE FRYING-ROASTING DEVICE

(75) Inventors: Jing Lin, Xiamen (CN); Tachi Liu, Xiamen (CN)

(73) Assignee: Tsann Kuen (Zhangzhou) Enterprise Co., Ltd., Zhangzhou (CN)

( * ) Notice: Subject to any disclaimer, the term of this patent is extended or adjusted under 35 U.S.C. 154(b) by 677 days.

(21) Appl. No.: 12/527,604

(22) PCT Filed: Jan. 11, 2008

(86) PCT No.: PCT/CN2008/000075
§ 371 (c)(1), (2), (4) Date: Aug. 18, 2009

(87) PCT Pub. No.: WO2008/089651
PCT Pub. Date: Jul. 31, 2008

(65) Prior Publication Data
US 2010/0180776 A1    Jul. 22, 2010

(30) Foreign Application Priority Data

Jan. 17, 2007 (CN) .......................... 2007 2 0006113

(51) Int. Cl.
*A47J 37/07* (2006.01)
(52) U.S. Cl.
USPC ......................................................... 99/339
(58) Field of Classification Search .............. 99/339, 99/340, 341; 126/194, 200
See application file for complete search history.

(56) References Cited

U.S. PATENT DOCUMENTS

| 1,767,802 | A | * | 6/1930 | Langos | 99/440 |
| 2,033,060 | A | * | 3/1936 | Anderson | 99/379 |
| 2,608,727 | A | * | 9/1952 | Ball | 49/257 |
| 2,710,906 | A | * | 6/1955 | Lipsich et al. | 219/487 |
| 2,765,727 | A | * | 10/1956 | Lipsich et al. | 99/331 |
| 3,121,385 | A | * | 2/1964 | Blackburn et al. | 99/374 |
| 3,231,718 | A | * | 1/1966 | Vasile | 219/450.1 |
| 3,380,770 | A | * | 4/1968 | Risley | 292/175 |
| 3,771,433 | A | * | 11/1973 | King | 99/331 |
| 3,824,916 | A | * | 7/1974 | Green et al. | 99/334 |
| 3,848,110 | A | * | 11/1974 | Giguere et al. | 219/525 |
| 3,936,660 | A | * | 2/1976 | Blackwood | 219/467.1 |

(Continued)

FOREIGN PATENT DOCUMENTS

| CN | 200998178Y Y | 1/2008 |
| EP | 0657132 B1 | 7/1999 |
| JP | 8173326 A | 7/1996 |

*Primary Examiner* — Henry Yuen
*Assistant Examiner* — Eric Stapleton
(74) *Attorney, Agent, or Firm* — Rabin & Berdo, P.C.

(57) ABSTRACT

A frying-roasting device comprises a bottom base, an oil storing plate, an electric heating frying-roasting plate and an upper cover. There are bosses extending backwards at two sides of a back end of the bottom base. R-shaped orbits are included that have openings from the bosses' back end that extend toward the bosses' front lower parts. Jointed shafts extend outward at a back end of two sides of the upper cover. The jointed shafts are inserted in the r-shaped orbits to form a hinging connection. There are two blocking walls that extend from a back end to an inside of each boss. The height of the two blocking walls is lower than openings of the r-shaped orbits. When the upper cover is opened, the back connecting member is blocked by the frying-roasting plate and the two blocking walls so that the upper cover remains sloped.

2 Claims, 3 Drawing Sheets

U.S. PATENT DOCUMENTS

| | | | |
|---|---|---|---|
| 4,027,139 A * | 5/1977 | Theimer | 219/525 |
| 4,206,345 A * | 6/1980 | Maass et al. | 219/524 |
| 4,241,650 A * | 12/1980 | John et al. | 99/372 |
| 4,571,456 A * | 2/1986 | Paulsen et al. | 379/457 |
| 5,213,302 A * | 5/1993 | Rowe, Jr. | 248/459 |
| 5,404,795 A * | 4/1995 | Coble | 99/339 |
| 5,513,558 A * | 5/1996 | Erickson et al. | 99/330 |
| 5,839,356 A * | 11/1998 | Dornbush et al. | 99/331 |
| 6,230,702 B1 * | 5/2001 | Lee | 126/198 |
| 6,237,470 B1 * | 5/2001 | Adams | 99/422 |
| 6,443,052 B1 * | 9/2002 | Garber et al. | 99/339 |
| 2003/0230199 A1 * | 12/2003 | Huang | 99/403 |
| 2005/0051036 A1 * | 3/2005 | Erdmann et al. | 99/415 |
| 2005/0132897 A1 * | 6/2005 | Umali | 99/339 |
| 2006/0288876 A1 * | 12/2006 | Berger et al. | 99/323.5 |
| 2007/0028781 A1 * | 2/2007 | Popeil et al. | 99/407 |
| 2007/0256571 A1 * | 11/2007 | Popeil et al. | 99/407 |

* cited by examiner

LIFTING COVER TYPE FRYING-ROASTING DEVICE

TECHNICAL FIELD

The present invention relates to an electric heating cooker, especially to an electrical frying-roasting device.

BACKGROUND OF THE INVENTION

An electrical frying-roasting device may include a bottom base which has an open top. There is an electric heating frying-roasting plate disposed on the open top, and an upper cover for covering said frying-roasting plate. When frying or roasting the food, the power is first turned on. Next, the upper cover is removed and food is put on the frying-roast plate. Then the upper cover is moved to cover the frying-roast plate. When the food is about ready, the upper cover is removed again, then the food is flipped on the frying-roasting plate. Finally the food is taken out of the device when it is ready. During the process, a space to accommodate the upper cover after removing the upper cover from the frying-roast plate is needed. This causes inconvenience. Furthermore, it may be difficult to clean the wall behind the electrical frying-roasting device because the hot oil from the food spatters onto the wall.

SUMMARY OF THE INVENTION

An object of the present invention is to provide a lifting-cover frying-roasting device, wherein its upper cover can be lifted or moved down with the jointed shaft of the bottom base. Moreover, the upper cover may be lifted to be separated from the bottom base for cleaning.

According to embodiments of the present invention, a lifting-cover frying-roasting device includes a bottom base which has an open top. The bottom base includes bosses extending backwards at two sides of a back end of the bottom base. The bottom base also has r-shaped orbits that have openings formed at back ends of the bosses. The r-shaped orbits extend towards front lower parts of the bosses. The r-shaped orbits are each set inside of one of the bosses. The r-shaped orbits are each curved. The bottom base includes blocking walls that extend from the boss back ends to the inside of each boss. A height of the blocking walls is lower than a height of the openings of the r-shaped orbits. The bottom base also has a joint deck at a front end of the bottom base. The lifting-cover frying-roasting device further includes an electric heating frying-roasting plate disposed on said open top. The plate includes a plate body. The lifting-cover frying-roasting device also includes an upper cover covering the electric heating frying-roasting plate. The upper cover has a curved shape extending from a first side of the upper cover to a second side opposite the first side of the upper cover. The upper cover includes two jointed shafts that are inserted in the r-shaped orbits to form a disengageble hinging connection. The upper cover is movable to be lifted to form the hinging connection. The upper cover includes a buckle set at a front of said upper cover. The buckle is engageable with the joint deck for clamping said upper cover to the bottom base. The upper cover includes a back connecting member made of plastic. The two jointed shafts extend outward from two sides of a back end of the back connecting member. The upper cover further includes a front connecting member made of plastic. The upper cover also includes a joint set at a front of the front connecting member. The upper cover further comprises a glass panel fastened between a front end of the back connecting member and a back end of the front connecting member. Each of the two jointed shafts is adapted to slide downward along a respective one of the r-shaped orbits to reach a bottom-most portion of the of the respective r-shaped orbit. A bottom surface of the back connecting member is blocked by a back surface of the plate body while a top surface of the back connecting member is blocked by the blocking walls thereby allowing the upper cover to be sloped when the frying-roasting device is in an open position. In some embodiments, the bottom base includes an oil storing plate.

DETAILED DESCRIPTION OF THE EMBODIMENTS

Figure 1:
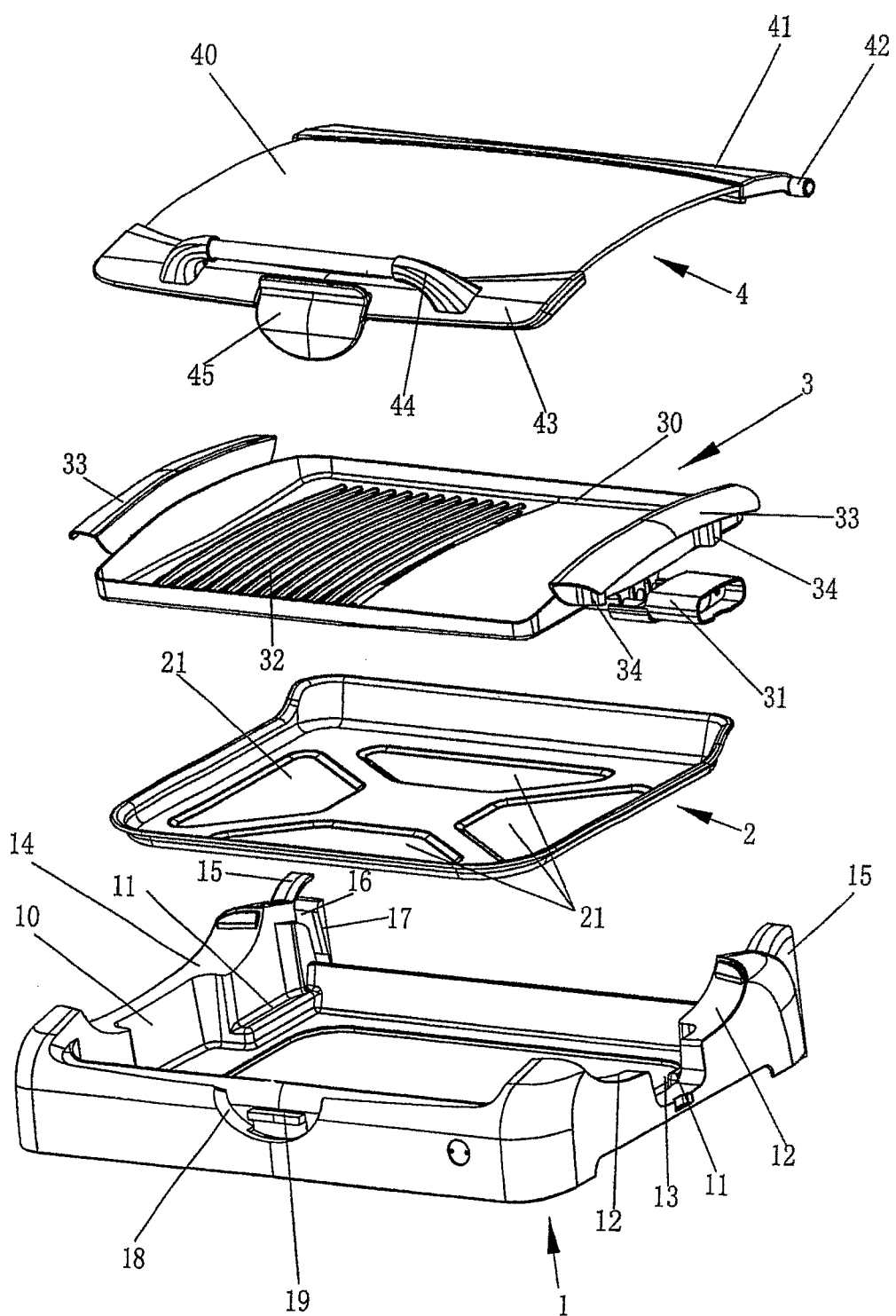
FIG. 1 illustrates a schematic view of an exploded structure of the preferred embodiment of the lifting-cover type frying-roasting device of the present invention.
Figure 4:
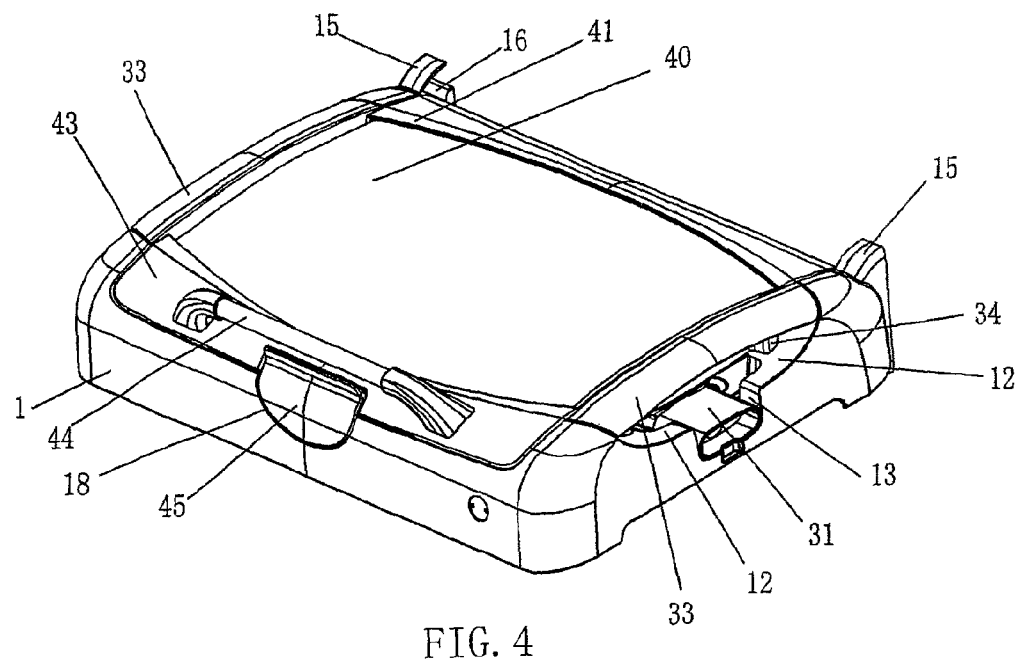
FIG. 4 illustrates a vertical view of the embodiment of FIG. 1.
Figure 5:
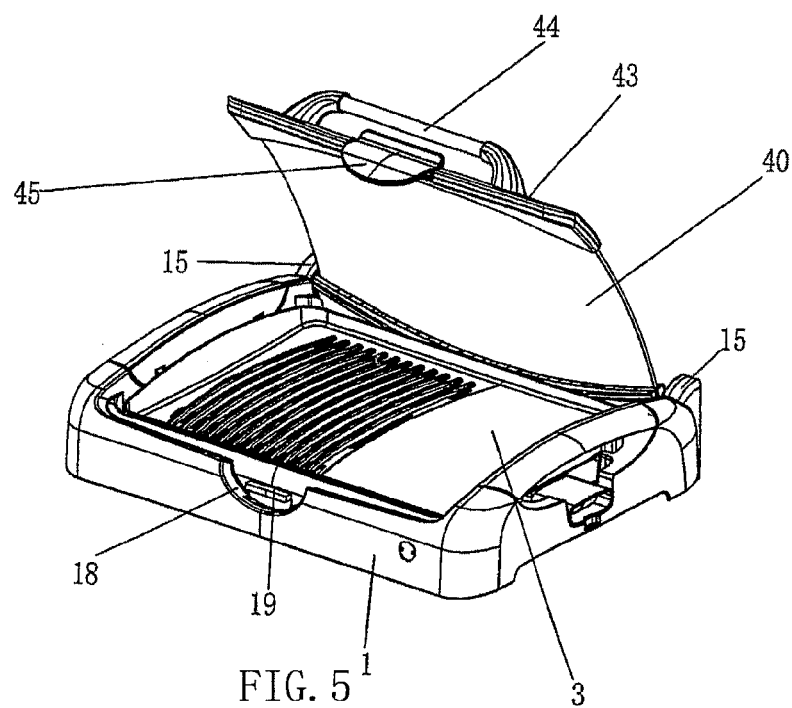
FIG. 5 illustrates a vertical view of the opening upper cover of the embodiment of FIG. 1.

The exploded structure of the preferred embodiment of the lifting-cover type frying-roasting device is shown in FIG. 1. The lifting-cover type frying-roasting device is composed of a bottom base 1, an oil storing plate 2, a electric heating frying-roasting plate 3 and an upper cover 4. Those four parts can be disassembled for cleaning, or may be assembled together for use as illustrated in FIG. 4 and FIG. 5.

Figure 2:
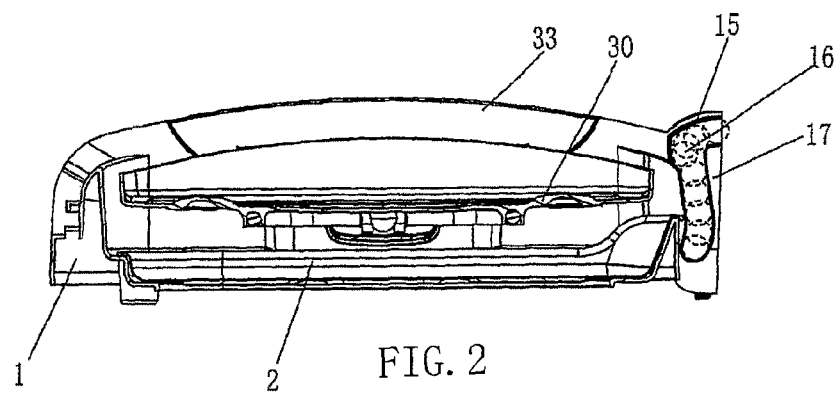
FIG. 2 illustrates a sectional view of the embodiment of FIG. 1.
Figure 3:
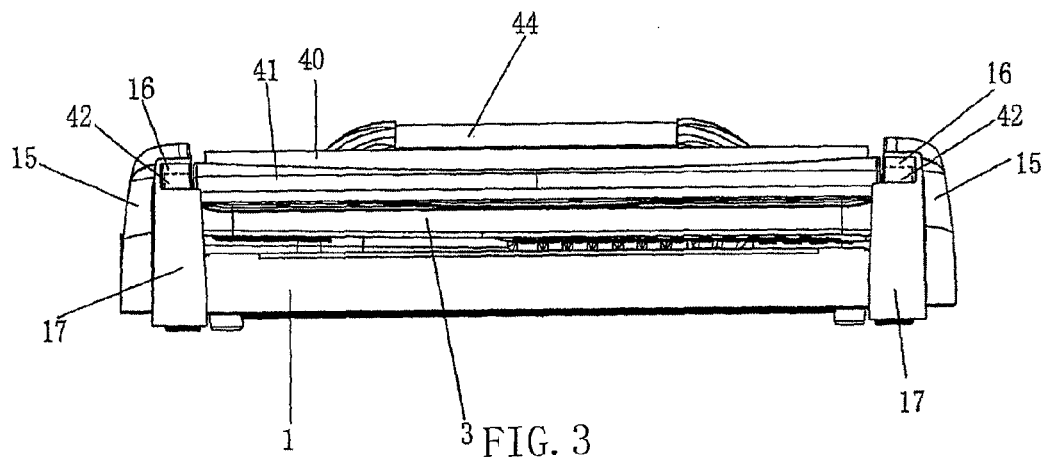
FIG. 3 illustrates a rear view of the embodiment of FIG. 1.

Bosses 11 are respectively set at the opening of the top end of bottom base 1 and four corners of the bottom of the open space 10 inside said bottom base 1. A curved groove 12 is disposed at the top surface of the right side wall of said bottom base 1. The middle of the groove 12 forms a small approximate rectangular groove 13 downward. A curved groove 14 is set at the top surface of the left side wall of said bottom base. Said groove 14 is opposite the groove 12 of the right side wall. There are bosses 15 respectively extending backward at two sides of the back end of the bottom base 1. R-shaped orbits 16 have openings that extend from back ends of the bosses 15 toward front lower parts of the bosses 15 and are respectively set in the inside of each boss 15 (please refer to FIG. 2). Blocking walls 17 respectively extend from the back end of the bosses 15 to the inside of the bosses 15 of the bottom base 1. The heights of the two blocking walls 17 are lower than the openings of the r-shaped orbits 16 (please refer to FIG. 3). There is a curved half-opened groove 18 set at the middle of the front end of bottom base 1. A buckle deck 19 is disposed at a back side of a curved bottom of groove 18.

The top of the oil storing plate 2 is open while its bottom is has a plurality of depressed regions 21 for accumulating oil.

The main body of electric frying-roasting plate 3 is a plate body 30 with electric heating units. The middle of the right side of said plate body 30 is electrically connected to socket 31. The inner bottom surface 32 of said plate body 30 is a frying-roasting working surface. The left and right side of said plate body 30 is respectively arranged with hanging rings 33 which extend upwardly and outwardly. A respective supporting flange 34 is set on the front and back side of the inward bottom surface of each hanging ring 33.

The upper cover 4 is composed of a slightly curved glass panel 40, a plastic back connecting member 41 and a plastic front connecting member 43. There is an inserting slot at the front side surface of said back connecting member 41. An inserting card is fastened to the back end of glass panel 40. A short jointed shaft 42 extends outward at the back end of two sides of the back connecting member 41 for connecting the back end of the bottom base 1. An inserting slot is set at the back surface of said front connecting member 43. An inserting card is fastened to the front end of glass panel 40. A handle 44 is set at the top surface of front connecting member 43. A buckle 45 is set at the middle of the front end of said front connecting member 43.

Before cooking, oil storing plate 2 is arranged into the open space 10 of the bottom base 1. The four corners of the bottom of oil storing plate 2 are respectively supported by the boss 11 inside the oil storing plate 2. The electric heating plate 3 is disposed on the open space 10 inside the bottom base 1, and located upon the oil storing plate 2. The supporting flanges 34 on the left and right side of the electric heating plate 3 are respectively disposed at the top surface of the left side wall groove 14 of bottom base 1, and at the top surface of the right side wall groove 12. Said socket 31 of electric heating frying-roasting plate 3 is located in the small groove 13 of the right side wall of the bottom base 1. Jointed shafts 42 of upper cover 4 are respectively inserted into the orbits 16 corresponding to the back end of bottom base 1 to form a hinging connection. In a position, said upper cover 4 clamps the plate body 30 of the electric heating frying-roasting plate 3 and covers said plate body 30 (please refer to FIG. 4).

Figure 6:
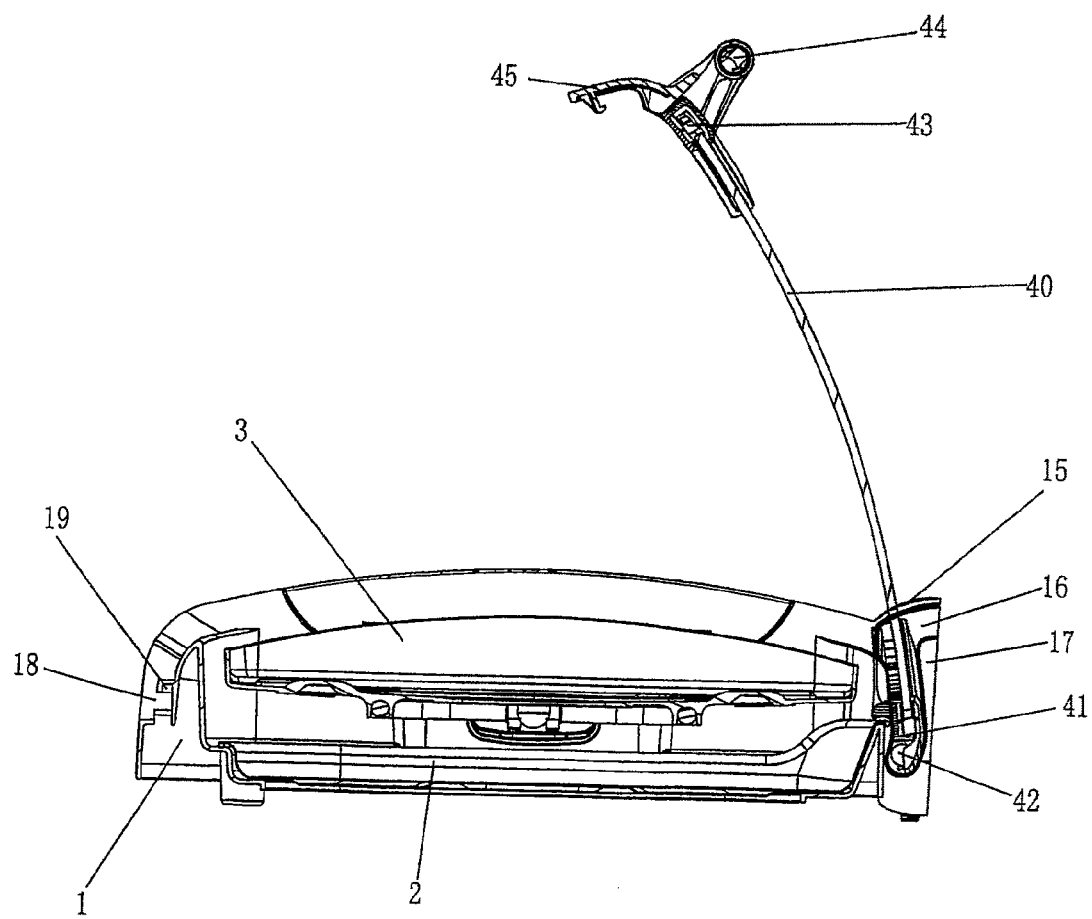
FIG. 6 illustrates a sectional view of the opening upper cover of the embodiment of FIG. 1.

When cooking food, the electric wire is first inserted into the socket 31 of the electric heating frying-roasting plate 3. The power is then turned on. The buckle 45 is turned to move it away from the buckle deck 19. The handle 44 of upper cover 4 is pulled in a rear-upper direction. The upper cover 4 is lifted, as showed in FIG. 5. The two short jointed shafts 42 of upper cover 4 respectively slide downward along the r-shaped orbit corresponding to the back end of the bottom base 1. The two short jointed shafts 42 finally slide to the bottom of the orbit 16. The bottom surface of back connecting member 41 of upper cover 4 is blocked by the back surface of plate body 30 of the electric heating frying-roasting plate 3; while the top surface of back connecting member 41 is blocked by the two blocking walls 17 of the bottom base 1. Thus the upper cover remains sloped, please refer to FIG. 6.

At this moment, the food can be disposed on the inner bottom surface 32 of plate body 30 of the electric frying-roasting plate 3. The handle 44 of said upper cover 4 is then pulled in a rear-upper direction, so the two short jointed shafts 42 of upper cover 4 can be respectively lifted along the r-shaped orbits 16 corresponding to the back end of bottom base 1 to the turning corner of the top of the orbits 16. Then the handle 44 is pulled so the two short jointed shafts 42 of upper 4 can respectively turn in the corresponding orbit 16. Then the upper cover 4 is clamped with the plate body 30 of said electric heating frying-roasting plate 3. During the cooking process, the oil droplets from the food would drop to the oil storing plate 2.

When the food is about ready, the handle 44 of upper cover 4 is pulled in an upper-rear direction. The upper cover 4 may be opened and is sloped. The food may be flipped and is then put on the plate body 30 of said electric heating frying-roasting plate 3. Finally the food is taken out of the device when it is ready.

During the cooking process, even when the upper cover 4 is lifted to open the roasting device, the spattering oil would be blocked by the upper cover 4 and would not spatter to the wall behind the device. After cooking, the electric wire must first be pulled from the socket 31 of said electric heating frying-roasting plate 3, and then the power is cut off. After the plate body 30 of said electric heating frying-roasting plate 3 cools down, the upper cover 4 is clamped with the plate body 30 of said electric heating frying-roasting plate 3, so that the buckle 45 of the front end of upper cover 4 falls to the half-opened groove 28 of the front end of bottom base 1, and is thereby clamped with the buckle deck 19. Thus the four parts 1, 2, 3, 4 of the present embodiment may be integrated together. Further, the back surface of two bosses 15 of the bottom base 1 are formed in a downward direction; such an arrangement would reduce the occupation area of the present embodiment in the kitchen.

In the cleaning process, firstly pull the handle 44 of said upper cover 4 in an upper-rear direction, so that the two short jointed shafts 42 of upper cover 4 can be respectively lifted along the r-shaped orbits 16 corresponding to the back end of bottom base 1. The two short jointed shafts 42 are lifted to the turning corner of the top of said orbit 16 and then the handle 44 is slightly pulled backward, so the two short jointed shafts 42 of upper cover 4 are respectively withdrawn from the corresponding orbits 16. Thus, the upper cover 4 is taken off from the back of said bottom base 1. Then the hanging ring 33 is pulled off the left and right side of the electric heating frying-roasting plate 3 to take said electric heating frying-roasting plate 3 off of said bottom base 1. Thus, the cleaning is convenient since the four parts 1, 2, 3, 4 are completely disassembled with each other.

INDUSTRIAL APPLICABILITY

The lifting-cover type frying-roasting device of the present invention has an upper cover 4 that may be lifted or clamped. A hinged joint is formed with the bottom base 1 and has a simple structure and is easy to use.

The invention claimed is:
1. A lifting-cover frying-roasting device comprising:
a bottom base which has an open top, the bottom base including
bosses extending backwards at two sides of a back end of the bottom base, r-shaped orbits having openings that are formed at back ends of the bosses, the r-shaped orbits extending towards front lower parts of the bosses, the r-shaped orbits each being set inside of one of the bosses, the r-shaped orbits each being curved, blocking walls that extend from the boss back ends to the inside of each boss, a height of the blocking walls being lower than a height of the openings of the r-shaped orbits, and
a joint deck at a front end of the bottom base;
an electric heating frying-roasting plate disposed on said open top, the electric heating frying-roasting plate including a plate body;
an upper cover covering the electric heating frying-roasting plate, said upper cover having a curved shape extending from a first side of the upper cover to a second side opposite the first side of the upper cover,
the upper cover including
two jointed shafts being inserted in the r-shaped orbits to form a disengageble hinging connection, the upper cover being movable to be lifted to form the hinging connection,
a buckle set at a front of said upper cover, said buckle being engageable with the joint deck for clamping said upper cover to the bottom base, a back connecting member made of plastic, the two jointed shafts extending outward from two sides of a back end of the back connecting member,
a front connecting member made of plastic,
a joint set at a front of the front connecting member; and
a glass panel, fastened between a front end of the back connecting member and a back end of the front connecting member,
wherein each of the two jointed shafts is adapted to slide downward along a respective one of the r-shaped orbits to reach a bottom-most portion of the respective r-shaped orbit, and
further wherein a bottom surface of the back connecting member is blocked by a back surface of the plate body while a top surface of the back connecting member is blocked by the blocking walls thereby allowing the upper cover to be sloped when the frying-roasting device is in an open position.

2. The lifting-cover frying-roasting device according to claim 1, wherein said bottom base includes an oil storing plate.

\* \* \* \* \*